United States Patent [19]

Komai et al.

[11] Patent Number: 4,737,138

[45] Date of Patent: Apr. 12, 1988

[54] FABRIC-COVERED COGGED BELT

[75] Inventors: Takahiko Komai, Takasago; Kyoichi Mishima, Higashi; Takeshi Hamura, Komaki, all of Japan

[73] Assignee: Mitsuboshi Belting Ltd., Kobe, Japan

[21] Appl. No.: 27,853

[22] Filed: Mar. 19, 1987

[30] Foreign Application Priority Data

Mar. 22, 1986 [JP] Japan ................................ 61-64622

[51] Int. Cl.⁴ .............................................. F16G 3/10
[52] U.S. Cl. .................................... 474/266; 474/254
[58] Field of Search ............................... 474/264–268, 474/253, 254, 258, 259; 156/138–142, 304.1

[56] References Cited

U.S. PATENT DOCUMENTS

| | | | |
|---|---|---|---|
| 3,783,704 | 1/1974 | Lawson | 474/254 |
| 4,034,617 | 7/1977 | Guyer | 474/254 X |
| 4,276,039 | 6/1981 | Takano | 474/267 X |

*Primary Examiner*—James A. Leppink
*Assistant Examiner*—Thuy M. Bui
*Attorney, Agent, or Firm*—Wood, Dalton, Phillips, Mason & Rowe

[57] ABSTRACT

A V-belt and method of making the same wherein a joint between opposite ends of the rubber portion of a belt preform is offset a preselected distance from one or more joints of fabric bonded to at least one of the inner and outer surfaces of the belt. The rubber and fabric are cut in making the preform suitably to have juxtaposition of the opposite ends thereof when wrapped about a mandrel in forming a belt sleeve from which the final V-belts are formed. Where the final belts are W-belts, a similar manufacture of the outer portion of the belt is effected. The fabric-covered portion of the belt may be cogged and the preselected spacing of the rubber and fabric joints is at least the pitch of the cogs. The fabric is preferably stretchable fabric.

27 Claims, 3 Drawing Sheets

FABRIC-COVERED COGGED BELT

TECHNICAL FIELD

This invention relates to belts and in particular to fabric-covered belts.

BACKGROUND ART

In one conventional belt manufacture, the body of rubber is looped and provided on its inner surface with a cover fabric. In one form of such belt, the inner surface is undulated so as to define a series of cogs.

It is also known to provide such cogs in the outer surface of the belt, which outer surface may similarly be provided with a cover layer of fabric.

It has been conventional in forming such belts to firstly form a preform consisting of one or more layers of fabric and an overlying body of compression rubber. An overlying layer of cushion rubber for accepting the tensile cords of the belt may be provided on the upper surface of the preform. The preform is wrapped about a cylindrical grooved mandrel adapted to receive the cogged portions of the preform. Opposite ends of the preform are juxtaposed. The tensile cords may then be wrapped around the preform on the mandrel, an outer cushion rubber layer placed around the tensile cords, and an outer layer of tensile rubber wrapped thereabout. If desired, an outer layer of fabric may also be wrapped around the outer layer of tensile rubber. This assembly is then cured by suitable heating so as to vulcanize the rubber to form a belt sleeve which is then slit circumferentially to define a plurality of individual V-belts.

Where the outer tensile rubber portion of the belt is cogged, a preform similar to that provided for forming the compression portion of the belt may be formed and wrapped about the outer cushion rubber layer. An outer grooved mold may be engaged with the outwardly facing cogged layer in forming the inner and outer cogged belt sleeve.

A problem arises in such manufacture in that it has been conventional to cut the preform so as to define juxtaposed end surfaces when wrapped about the mandrel. As the joint thus produced extends fully through the tensile rubber and fabric, a problem has arisen in the failure of such joint in use, notwithstanding the attempted bonding of the opposite ends of the preform during the belt molding operation on the mandrel.

DISCLOSURE OF THE INVENTION

The present invention comprehends an improved belt manufacture eliminating the disadvantages and problems of the prior art belts as discussed above, while yet permitting the manufacture in a simple and economical manner.

More specifically, the invention comprehends the manufacture of such a preform wherein the end surfaces of the rubber portion of the preform are spaced from the end surfaces of the fabric, thereby avoiding an alignment of the end surfaces in the formed sleeve and V-belts.

More specifically, the invention comprehends the disalignment of the fabric and rubber body portions by at least one pitch of the cogs.

In the illustrated embodiment, the rubber body end faces are aligned with the center of the crest of a cog.

The inner fabric is illustrated as comprising a plurality of layers, the end edges of which are spaced from each other by approximately one pitch and from the position of the end faces of the rubber by at least one pitch.

The invention comprehends that the fabric joints be located at or adjacent the crest of the cogs. The invention more specifically comprehends that the fabric joints be located in the area extending from the tip of the crest no more than two-thirds of the distance toward the center of the valley between the crests.

The invention further comprehends that the fabric comprises a resiliently stretchable fabric, such as a bias laid fabric, a fabric having extensible warp yarns, a cord fabric wherein cords are laminated in a bias shape by crossing of the layers at a preselected angle, etc.

The fabric is preferably rubberized by coating thereof with a suitable elastomeric material having a thickness in the range of approximately 0.1 to 3.0 the thickness of the fabric.

The cogged belt of the present invention is extremely simple and economical of manufacture, while yet providing a highly improved, long-life belt structure.

BRIEF DESCRIPTION OF THE DRAWINGS

Other features and advantages of the invention will be apparent from the following description taken in connection with the accompanying drawing wherein.

BEST MODE FOR CARRYING OUT THE INVENTION

Figure 1:
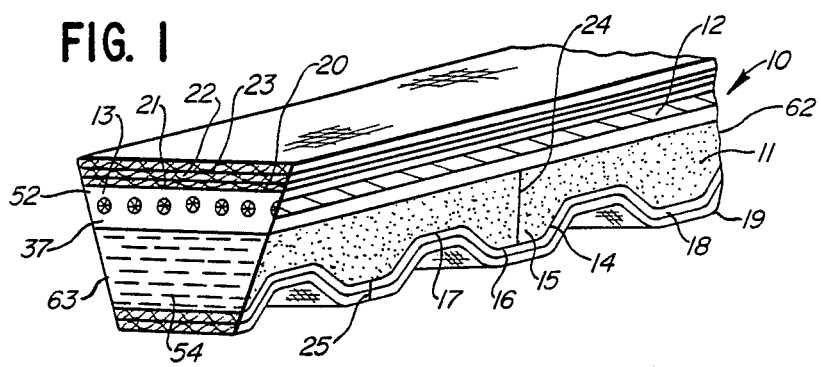
FIG. 1 is a fragmentary perspective view of a cogged belt embodying the invention.

In the illustrative embodiment of the invention as disclosed in the drawing, a V-belt generally designated 10 embodying the invention is shown to comprise a raw edge cogged belt. The belt includes a compression rubber portion 11. Conventional tensile cords 12 may be embedded in a body of cushion rubber 13.

As further illustrated in FIG. 1, the inner surface 14 of the compression section is undulate, defining a plurality of cogs 15 having crests 16 and intermediate valleys 17.

Inner surface 14 may be covered with fabric, and in the embodiment of FIG. 1, a plurality of layers 18 and 19 of fabric is provided.

The outer surface 20 of the belt rubber may be provided with overlying fabric, illustratively comprising fabric layers 21, 22 and 23.

Figure 11:
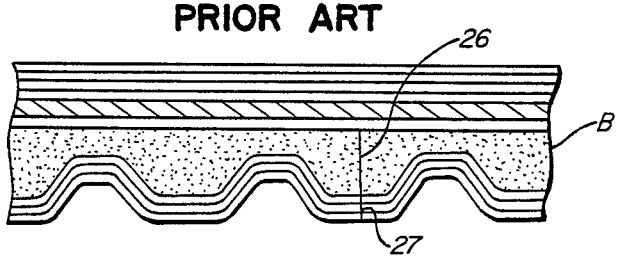
FIG. 11 is a longitudinal section illustrating conventional cogged belt constructions.

As discussed briefly above, the invention comprehends a novel manufacture of such a belt wherein a first joint 24 of the compression rubber body 11 and a joint 25 of the fabric portion is spaced apart a preselected distance in contradistinction to the conventional arrangement illustrated in FIG. 11, wherein the rubber body joint 26 is aligned with the fabric joint 27 of the conventional belt B. As indicated above, a frequent problem arises in such prior art belts in the failure of the belt along the common joints 26 and 27.

Figure 2:
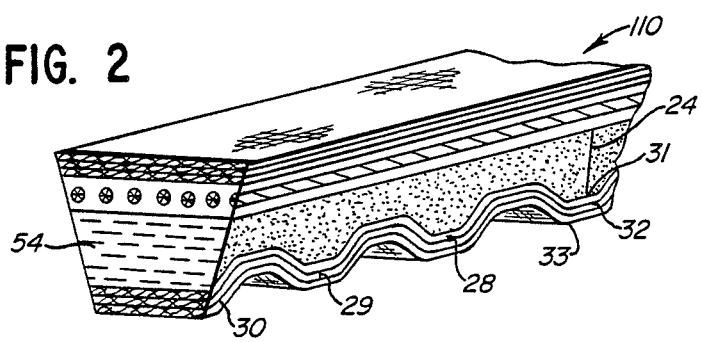
FIG. 2 is a fragmentary perspective view of another form of belt embodying the invention.
Figure 3:
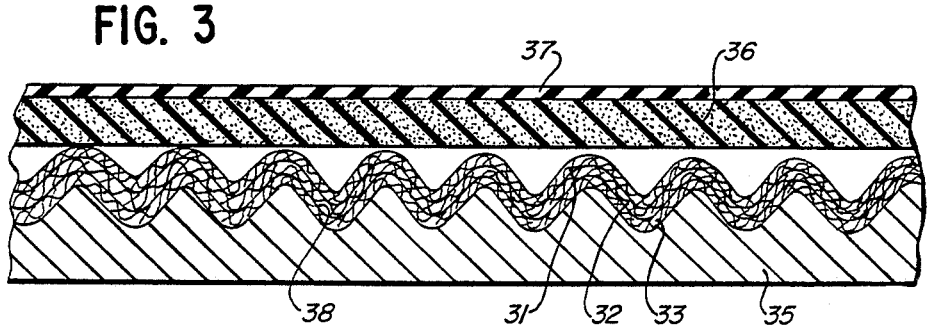
FIG. 3 is a fragmentary longitudinal section illustrating a first step in the forming of a preform for use in forming a belt sleeve of the invention.

In a modified form of V-belt embodying the invention illustrated in FIG. 2, a V-belt generally designated 110 is shown to comprise a V-belt generally similar to V-belt 10, but wherein the second, fabric joint 28, 29 and fourth, fabric joint 30 of the fabric layers 31, 32 and 33 respectively are offset one pitch of the cogs from each other, with the closest fabric joint 28 being spaced one pitch from the first, rubber joint 24. It has been found that such further spacing of the fabric joints provides further improved, long troublefree life of the cogged belt.

The invention comprehends the forming of an inner belt portion preform generally designated 34 by firstly placing the fabric layers 31, 32 and 33 on a grooved, flat mold 35. A sheet of compression rubber 36, having a sheet of cushion rubber 37 laminated thereto, is placed on the fabric and the rubber is then molded by suitable application of heat to cause the compression rubber to flow into the interstices between the ridges of the fabric received in the mold grooves 38.

Figure 5:
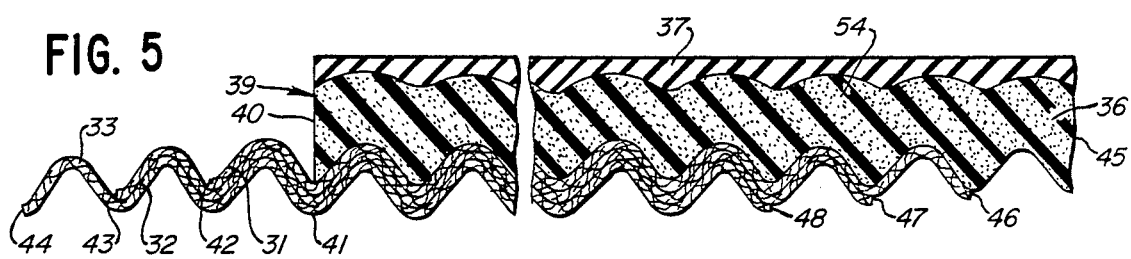
FIG. 5 is a fragmentary longitudinal section of the preform after the cutting thereof preparatory to placement thereof on the sleeve-forming mandrel.

The preform 34 is cut to define a sleeve preform 39 illustrated in FIG. 5. As shown therein, one end face 40 of the rubber is aligned with a crest 41 of the preform cog. An end 42 of the outer fabric layer 31 is spaced one cog pitch from the rubber face 40. End 43 of the fabric layer 32 is spaced one cog pitch from the fabric end 42 and fabric end 44 of the fabric layer 33 is spaced one cog pitch from the fabric end 43.

As further shown in FIG. 5, the opposite end face 45 of the rubber, outer fabric layer end 46, intermediate fabric end 47, and inner fabric end 48 are correspondingly separated by one cog pitch each.

Figure 6:
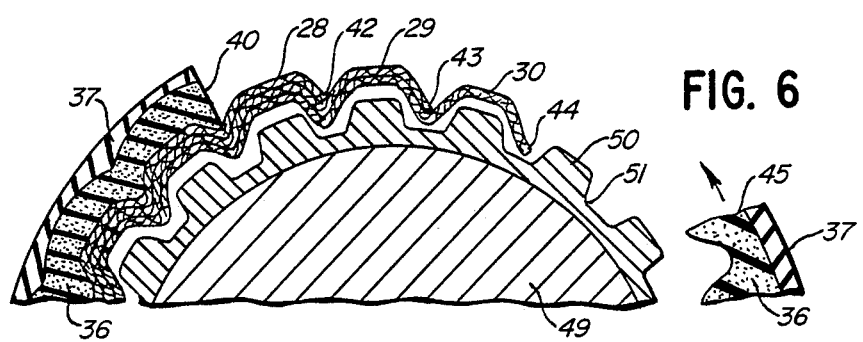
FIG. 6 is a fragmentary section illustrating the placement of one end of the preform on the sleeve-forming mandrel.

The length of the sleeve preform 39 is preselected to define a single wrap about a mandrel 49 having outwardly projecting ribs 50 circumferentially spaced by grooves 51. The preform crests 41 are received in the grooves 51, as illustrated in FIG. 6, and preform rubber end face 45 is brought circumferentially about the mandrel to become juxtaposed to the opposite rubber end face 40. In this arrangement, outer fabric end 46 is juxtaposed to outer fabric end 42, intermediate fabric end 47 is juxtaposed to intermediate fabric end 43, and inner fabric end 48 is juxtaposed to inner fabric end 44, with each of the juxtaposed joints being offset one cog pitch from each of the adjacent joints.

In forming the sleeve on mandrel 49 from which the individual V-belts are subsequently divided, suitable conventional tensile cords are wrapped about the inner cushion rubber layer 37 and an outer rubber cushion layer 52 is placed in overlying association with the tensile cords. Outer fabric layers 21, 22 and 23 are then wrapped about the outer cushion layer 52 and the entire assembly enclosed in an outer mold portion (not shown), whereupon suitable heating of the sleeve preform is effected to vulcanize the rubber and urge the preform components into the configuration illustrated in FIG. 2.

Upon completion of the curing process, the belt sleeve is removed from the mandrel and divided by effecting a plurality of circumferential parallel cuts therethrough to form the desired individual V-belts, such as V-belt 110 illustrated in FIG. 2.

The vulcanization of the sleeve may be effected by suitable heating and pressurization of the sleeve preform in the mold, as will be obvious to those skilled in the art.

Figure 4:
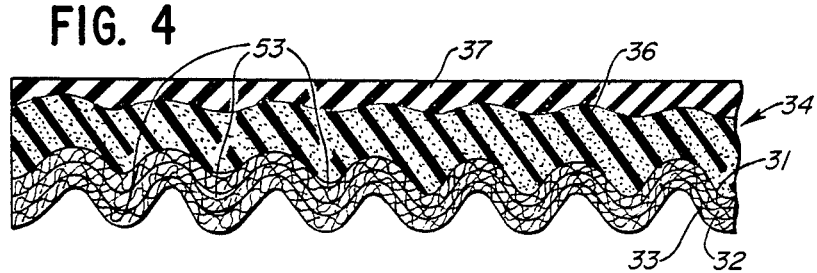
FIG. 4 is a fragmentary longitudinal section of the preform.

In forming the sleeve preform 39, facilitated removal of portions of the rubber and fabric layers to define the cut ends 40,45, 42,46, 43,47, and 44,48 may be effected by inserting separating strips 53 in the assembly, as illustrated in FIG. 4. Such strips may be formed of film, foil, paper, etc. Any remaining portions of the strips inwardly of the cuts become bonded within the preform and permit subsequent further removal of the material so as to permit adjustment of the location of the cut ends.

As discussed above, the outer surface of the belts may be provided with fabric layers, such as fabric layers 21, 22 and 23 of belt 10. The invention further comprehends that the outer portion of the belt may be provided with cogs also so as to form what is conventionally known as a W-belt configuration. In forming such a W-belt structure, the outer portion of the belt may be formed in a manner similar to the formation of the inner portion discussed above by utilizing a sleeve preform, as shown in FIG. 4, but in an inverted disposition, to be placed over the tensile cords wrapped around the inner cushion layer 37. Thus, the cushion rubber of such an outer preform defines the outer cushion rubber portion 52 of the cushion rubber 13 in which the tensile cords 12 are embedded. In forming the outer cogs, the outer mold (not shown) is provided with a grooved configuration complementary to the grooved configuration of mandrel 49. The juxtaposition of the cut ends of the preform in forming the outer cogged portion of the W-belt is effected in a reversely similarly manner to the method illustrated in FIG. 6 relative to the inner portion.

In the illustrated embodiment, the cushion rubber is preferably formed of conventional rubber, such as NR, SBR, CR, BR, or NBR rubber, or any blend thereof as desired. The compression rubber layer may be provided with reinforcing short staple fibers. In forming the preform 34, an upper platen may be utilized heated to a relatively low temperature, such as approximately 20° to 90° C. for pressing the rubber into the convolutions of the fabric laid on the mold 35.

The fabric layers are preferably individually rubber coated. The fabric is preferably formed of a bias fabric, such as bias canvas, and may be formed of natural or synthetic fibers. Preferably the fabric is resiliently stretchable and may comprise a wide angle bias canvas having warps and wefts at a crossing angle of approximately 90° to 150° relative to the longitudinal extent of the belt. Alternatively, the fabric may be formed of a stretchable fabric having warps formed of woolly processed reinforcing yarns or stretchable yarns, such as spandex yarns. The wefts may be woven of conventional natural or synthetic fibers.

Alternatively, the fabric may be formed as a cord fabric of natural or synthetic fibers wherein layers of cords are superposed to have crossing angles of approximately 120° to 180°. The fabric may include both canvas and cord fabric layers.

The rubber coating of the fabric may have a thickness in the range of approximately 0.1 to 3.0 times the thickness of the fabric.

If desired, the separators 53 may be removed following the cutting operation.

Rubber end faces 40 and 45 are illustrated in FIG. 5 as extending perpendicularly to the longitudinal extent of the belt. It is preferable that the surfaces be formed at an angle to the horizontal extent of the preform in the range of 30° to 150°.

Figure 7:
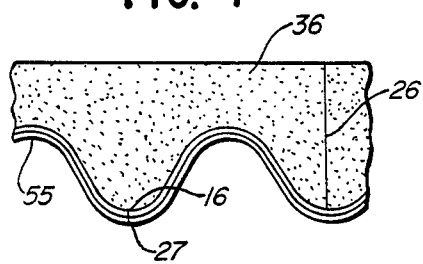
FIGS. 7 through 10 illustrate different relationships of the rubber joint to the fabric layer joints.
Figure 8:
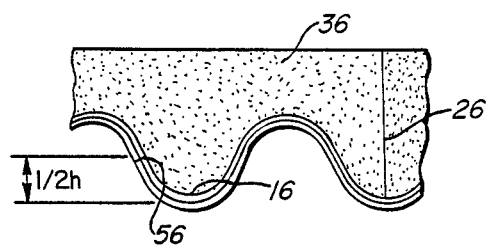
Figure 9:
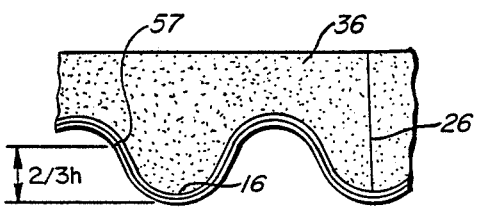
Figure 10:
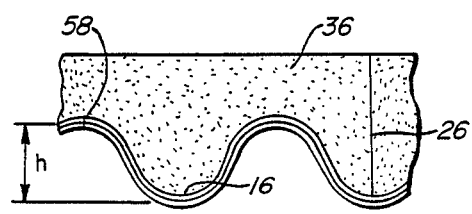

Referring now to FIGS. 7–10, it has been found that the invention may be effectively carried out by cutting the fabric layers at a portion thereof adjacent the crest of the cog and spaced from the bottom 55 of the cog valley such that the location of the cut is no more than two-thirds the depth of the valley taken from the crest outwardly. Thus, the fabric may be cut directly at the cog crest 27, as shown in FIG. 7. The fabric may be cut at 56 at a depth of one-half the valley, as illustrated in FIG. 8, and may be cut at 57 at a depth of two-thirds of the depth of the valley, as shown in FIG. 9. In a comparison manufacture, the fabric was cut at 58 corresponding to the inner end of the valley at a depth H from the crest. It has been found that by maintaining the cut of the fabric at a depth no greater than two-thirds the depth of the valley from the crest, a substantially improved belt construction results. Such a configuration effectively minimizes cracking of the belt and provides long, troublefree life thereof.

Figure 12:
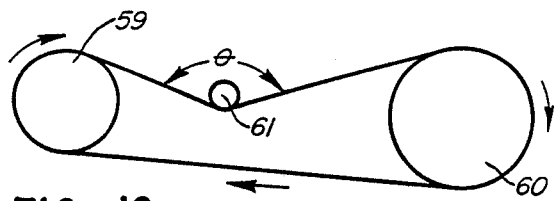
FIG. 12 is a schematic representation of a method of testing the belts in determining the superior characteristics of the belts of the invention.

A number of belts manufactured in conformity with the invention and the prior art were tested on apparatuses illustrated in FIG. 12. A belt corresponding to belt 110 of FIG. 2, having a length of 40", was entrained about a pair of pulley, including a drive pulley 59 and a driven pulley 60. The drive pulley had a diameter of 90 mm. and the driven pulley had a diameter of 150 mm. A tension pulley 61 has pressed against the backside of the belt so as to form an angle of approximately 140°. The belt was driven at a speed of 1800 rpm under a 6-ps. load. The belt was run for a total life of 258 hours before crack damage appeared at the valley of the cog.

A similar belt manufactured in conformity with the belt illustrated in FIG. 11 was similarly tested. The belt B separated at the joint 26 after 37 hours' operation under such conditions. Thus, the improved belt structure of the present invention exhibited a useful life of approximately seven times the life of the conventional belt.

A similar test of belts utilizing the arrrangements of FIGS. 7–11 was conducted with an apparatus such as shown in FIG. 12, wherein the belts had a length of 33". The drive pulley had a diameter of 60 mm. and the driven pulley had a diameter of 60 mm., with the tension pulley having a diameter of 50 mm. The reverse bending angle was 150°, with the belt being run at a speed of 3600 rpm and a load of 80 kg.

The results of the tests of the various belts is shown in the attached Table 1.

TABLE 1

| | Belts Manufactured in Accordance with this Invention | | | Comparison Example | Conventional Belt |
| --- | --- | --- | --- | --- | --- |
| Joint | 26 | 56 | 57 | 58 | 26–27 |
| Running Life (hrs) | 200 | 190 | 165 | 30 | 46 |
| Damage Phenomenon | Cracked at Crest | | | Cracked at Valley | Cracked at Aligned |

TABLE 1-continued

| Belts Manufactured in Accordance with this Invention | Comparison Example | Conventional Belt |
| --- | --- | --- |
| | | Joints |

From the above table, it may be seen that substantially improved results are obtained by providing the spaced relationship between the rubber joint and the fabric joints and by locating the fabric joints within two-thirds of the cog depth from the crests thereof.

In broadest aspect, the invention comprehends the spacing of the rubber and fabric joints by a preselected distance. In the illustrated embodiment, the distance between joints is at least the pitch of the cogs. The invention further comprehends that the fabric joints be located within two-thirds of the depth of the cogs from the crests thereof. The invention further comprehends that the rubber joint be defined by planar surfaces extending within the range of 30 to 150 degrees to the longitudinal plane of the belt.

In the illustrated embodiment, the belt comprises a raw edge belt wherein no fabric is provided on the side edges 62 and 63 of the V-belts. As discussed, fabric layers are provided on the inner surface defining the cogs and may also be provided on the outer surface which may be flat or cogged, as desired, as discussed above.

The invention further broadly comprehends the manufacture of such a belt by suitably cutting the opposite ends of a preform, including a compression rubber layer and one or more lower fabric layers. The cutting of the fabric layers is preselected to be at least one cog pitch from the rubber cut. the cuts of the fabric layers may be aligned a single location or may be separated from each other. Inserts may be provided between the various layers to facilitate the cutting operation.

The cut preform is wrapped about a mandrel so as to bring the opposite ends thereof into juxtaposition prior to the winding of the tensile cords thereabout and provision of the outer portions of the belt about the tensile cords. Where the outer portion of the belt is to be cogged, a preform similar to the compression section preform is utilized in an inverted disposition.

The belt manufacture of the present invention provides a substantially improved, long troublefree life, while being extremely simple and economical.

We claim:

1. A looped V-belt comprising:
   at least one body of rubber having opposite ends, each said body of rubber being looped to have said ends thereof abutting at a first belt rubber joint and defining inner and outer surfaces; and
   fabric means comprising at least one fabric layer juxtaposed to at least one of said inner and outer surfaces and having coplanar opposite ends juxtaposed at at least one second belt fabric joint, each fabric belt joint of a fabric layer being misaligned with any rubber belt joint to a rubber body facially contiguous thereto.

2. The V-belt of claim 1 wherein said belt comprises a cogged belt defining cog crests, and said joints are spaced apart the distance between successive cog crests.

3. The V-belt of claim 1 wherein said belt comprises a cogged belt defining cog crests, each defining a center, and each said joint is aligned with a center of a cog crest.

4. The V-belt of claim 1 wherein said belt comprises a cogged belt defining cog crests and intermediate cog valleys, one of said layers comprising a fabric layer covering said cog crests and valleys and having its joint disposed at a location intermediate two of said cog valleys and no greater than approximately two-thirds the distance along the surface of the cog from the center of a cog crest to the center of an adjacent cog valley.

5. The V-belt of claim 1 wherein said belt comprises a cogged belt defining cogs each defining a cog crest and one of said fabric layers covers said cogs and has its joint disposed at a cog crest.

6. The V-belt of claim 1 wherein each said fabric layer comprises a rubber-coated fabric layer.

7. The V-belt of claim 1 wherein each rubber layer is provided with distributed staple fibers.

8. The V-belt of claim 1 wherein at least one of said fabric layers comprises a layer of bias laid canvas.

9. The V-belt of claim 1 wherein at least one of said fabric layers comprises a layer of wide angle bias laid canvas.

10. The V-belt of claim 1 wherein at least one of said fabric layers comprises a resiliently stretchable fabric layer.

11. The V-belt of claim 1 wherein at least one of said fabric comprises layers of cords extending angularly to the longitudinal direction of the belt.

12. The V-belt of claim 1 wherein at least one of said fabric layers comprises a rubber-coated fabric layer wherein the rubber coating has a thickness of approximately 0.1 to 3.0 the thickness of the fabric.

13. The V-belt of claim 1 wherein each of the outer and inner surfaces of the belt comprises a cogged surface defining cog crests, at least one fabric layer being provided on each of said cogged surfaces.

14. A looped V-belt comprising
a plurality of layers, each layer having opposite ends, and being looped to have said ends abutting at a joint, the joint of every layer of said belt being disaligned with the joint of any layer facially contiguous thereto, at least one of said layers being formed of rubber and at least one of said layers being formed of fabric.

15. A looped V-belt comprising:
at least one body of rubber having opposite ends, each said body of rubber being looped to have said ends thereof abutting at a first belt joint and defining inner and outer surfaces;
fabric means comprising at least one fabric layer juxtaposed to at least one of said inner and outer surfaces and having coplanar opposite ends juxtaposed at at least one second belt joint, each fabric belt joint of a fabric layer being misaligned with any rubber belt joint of a rubber body facially contiguous thereto said fabric means comprising first and second fabric layers facially contiguously laminated to each other, each fabric layer having opposite ends defining a fabric joint with the fabric joint of the first layer being spaced longitudinally of said belt.

16. The V-belt of claim 1 wherein each fabric joint is spaced from, the joints of layers opposite contiguous thereto longitudinally of the belt a similar preselected distance.

17. The V-belt of claim 15 wherein said belt comprises a cogged belt defining cogs spaced at a preselected pitch, and each said fabric joint is spaced from the joints of layers oppositely contiguous thereto longitudinally of the belt a distance substantially equal to the pitch of said cogs.

18. The V-belt of claim 17 wherein said cogs define cog crests and cog valleys, and each said fabric joint is disposed at a location intermediate said cog valleys and no greater than approximately two-thirds the distance along said inner surface from the center of a cog crest to the center of a cog valley.

19. The V-belt of claim 1 wherein at least one of said joints extends at an angle in the range of 30° to 150° to the longitudinal extent of the belt.

20. The V-belt of claim 19 wherein said joint extends perpendicularly to said longitudinal extent of the belt.

21. The method of manufacturing a belt comprising:
forming a tubular composite of a plurality of layers, at least one body of rubber having opposite ends, each said body of rubber being looped to have said ends thereof abutting at a first belt joint and defining inner and outer surfaces, and fabric means comprising at least one fabric layer juxtaposed to at least one of said inner and outer surfaces and having coplanar opposite ends juxtaposed to at least one second belt joint, each fabric belt joint of a fabric layer being misaligned with any rubber belt joint of a rubber body facially contiguous thereto.

22. The method of manufacturing a belt of claim 21 wherein one surface of the composite is formed to define a cogged surface defining cog crests, and said preselected distance comprises the distance between successive cog crests.

23. The method of manufacturing a belt of claim 21 wherein one surface of the composite is formed to define a cogged surface defining cog crests, and said joints are spaced apart a preselected distance comprising the distance between successive cog crests, each cog crest defining a center, said joints being aligned with the centers of said cog crests.

24. The method of manufacturing a belt of claim 21 wherein one surface of the composite is formed to define a cogged surface defining cog crests and intermediate cog valleys, said one of said fabric layers covering said cogged surface and having its joint disposed at a location intermediate two of said cog valleys and no greater than approximately two-thirds the distance along said cogged surface from the center of a cog crest to the center of a cog valley.

25. The method of manufacturing a belt of claim 21 wherein said joints define planar abutting end surfaces extending at an angle in the range of 30° to 150° to the longitudinal extent of the belt.

26. The method of manufacturing a belt of claim 21 wherein all said joints are spaced longitudinally of said belt at a preselected distance from the joints of any contiguous layers.

27. The method of manufacturing a belt of claim 21 further including the steps of forming cogs in each of the inner and outer surfaces of the belt, and providing a fabric layer on on each of said surfaces.

* * * * *